United States Patent [19]
Bertelsen

[11] 3,712,406
[45] Jan. 23, 1973

[54] GROUND EFFECT VEHICLE
[75] Inventor: William R. Bertelsen, Rock Island, Ill.
[73] Assignee: Bertelsen, Inc., Neponset, Ill.
[22] Filed: July 31, 1969
[21] Appl. No.: 871,765

Related U.S. Application Data

[63] Continuation of Ser. No. 633,357, April 21, 1967, abandoned, which is a continuation-in-part of Ser. No. 731,001, April 25, 1958, abandoned.

[52] U.S. Cl.............180/122, 104/23 FS, 244/12 R
[51] Int. Cl..............................................B60v 1/02
[58] Field of Search............180/117, 120, 122, 129; 104/23 FS; 244/12 R

[56] References Cited

UNITED STATES PATENTS

| | | | |
|---|---|---|---|
| 2,364,677 | 12/1944 | Warner | 180/120 UX |
| 2,387,627 | 10/1945 | Warner | 180/120 UX |
| 2,444,318 | 6/1948 | Warner | 180/120 UX |
| 2,838,257 | 6/1958 | Wibault | 180/117 UX |
| 3,065,935 | 11/1962 | Dubbury et al. | 180/122 X |
| 3,342,280 | 9/1967 | Beardsley | 180/129 |
| 3,363,716 | 1/1968 | Cockerell | 180/122 |

Primary Examiner—Kenneth H. Betts
Attorney—Henderson & Strom

[57] ABSTRACT

The vehicle of this invention is supported upon a cushion of gas, normally air, supplied by apparatus carried by the vehicle. The gas is directed generally downwardly beneath the vehicle. Portions of the gas are provided at different controllable angles of supply, and the portions are positioned to create propulsion, braking, and control forces for the vehicle. Forward propulsion and braking are controlled by fore and aft gas directing apparatus which vary the angle of fore and aft supply of pressurized gas beneath the vehicle. Roll forces are controlled by gas directing apparatus which vary the angle of lateral supply of pressurized gas beneath the vehicle. Yaw control forces are provided by apparatus differentially varying the lateral supply of portions of pressurized gas to create forces spaced from the center of lift or gravity or both of the vehicle. In addition, ports can be used to control pressurized gas flow beneath the vehicle to trim the vehicle for load variations, a predetermined trim, or other desired use. The vehicle also is adapted to operate upon new roadway structure that is grooved or shouldered to accommodate same.

6 Claims, 21 Drawing Figures

WILLIAM R. BERTELSEN
INVENTOR

WILLIAM R. BERTELSEN
INVENTOR

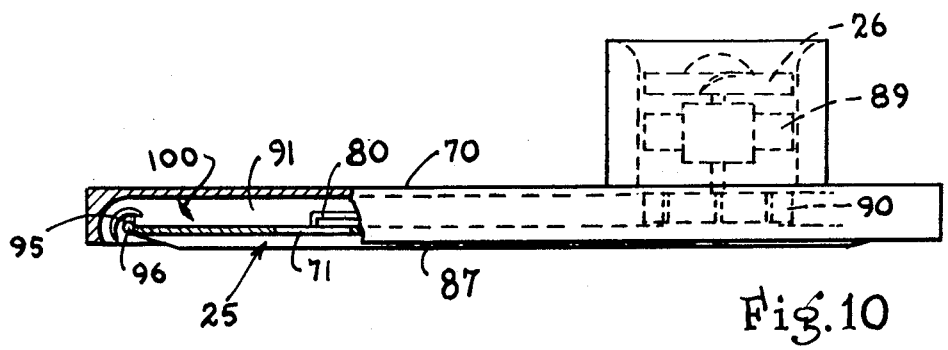
Fig.10
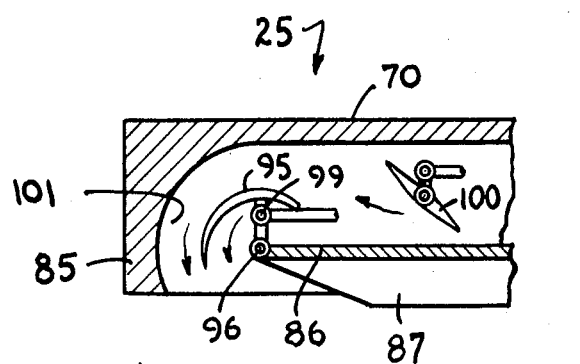
Fig.11
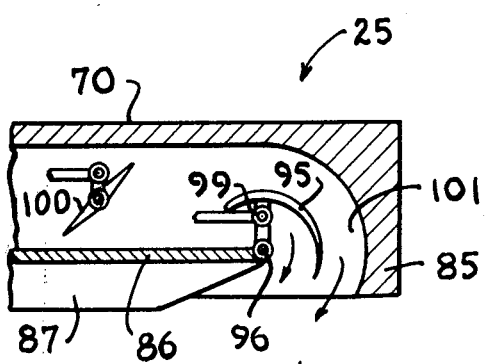
Fig.12
Fig.14
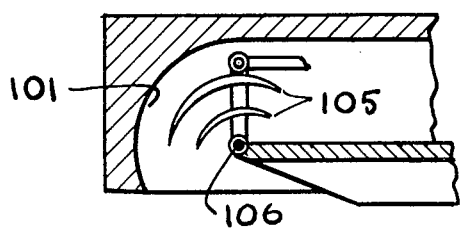
Fig.13
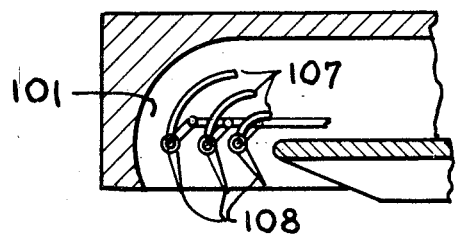
WILLIAM R. BERTELSEN
INVENTOR

WILLIAM R. BERTELSEN
INVENTOR

By 3,712,406

1

GROUND EFFECT VEHICLE

CROSS-REFERENCES TO RELATED APPLICATIONS

This application is a continuation of my application, Ser. No. 633,357 filed Apr. 21, 1967, and since abandoned, which application was a continuation of my parent application, Ser. No. 731,001 filed Apr. 25, 1958 and since abandoned.

The present invention relates to gas sustained vehicles, and in a broad concept to vehicles that are gas or air supported and dirigible either adjacent to or remote from a reaction surface.

One preferred embodiment of the invention comprises a combustion engine powered vehicle adapted to operate slightly above a reaction surface. Being spaced from such surface, the vehicle does not depend upon surface condition for support and can operate over soil, water, marsh, snow, etc. In fact, as will appear more fully below, the vehicle will operate more economically over rough terrain than over smooth terrain because of resistance to gas flow caused by surface roughness. In the following specification this vehicle will be referred to as "aeromobile."

Present automobiles are restricted in operation by several conditions. Roads comprise one major condition including several ancillary conditions such as snow, mud, ice, etc. that limit satisfactory use. Automobiles have little or no utility away from roads. The maximum speed attainable by present vehicles is restricted to practicable strength of tires, springs, and other essential parts.

The "aeromobile" herein disclosed is borne upon a layer of compressed gas such as air and the products of combustion of an engine, turbine, or the like.

The aeromobile permits use of a different kind of road that will center the vehicle in a lane. The road is grooved and the aeromobile equipped with front and rear baffles to conform to the transverse curvature of the groove. When driving along a groove the operator will exercise no control except to accelerate, stop, or move laterally to another groove for passing.

Other modifications of the invention are useful in boats, aircraft, trucks, pallet transporters, crop sprayers, and others. In each of these the same principles of sustentation and control are utilized. Because the vehicle is supported during operation upon a volume of compressed gas, it is preferable to fabricate parts from materials having a favorable weight to strength ratio. The properties of such materials are well known and hence specific materials will not be recited in the following specification.

In keeping with the teachings hereof, the basic vehicle comprises a frame having gas inlet and outlet openings. The outlet may comprise several controlled outlet portions to render the vehicle dirigible. A compressor forces gas between the bottom of the vehicle and the surface to float same about the surface. For practical purposes it is preferred that the volume of the gas be variable to support the vehicle at sufficient distance above the surface to clear ordinary road obstacles (6 inches for example) and to provide large volumes for jumping large obstacles.

Accordingly, a first object of the present invention is to provide an air supported vehicle adapted for dirigible translations.

2

A second object of the invention is to provide manual control mechanism for a vehicle as set forth in the first object.

A further object is to provide a novel road and an air supported vehicle for operation on said road.

A still further object of the invention is to provide auxiliary controls for augmenting the function of the control mechanism set forth in the second object.

Another object of the invention is to provide structure for transporting passengers and adapted to be air sustained at least partially by aerodynamics forces resulting from translation.

The foregoing and other objects and advantages of the present invention will be either pointed out or obvious in the following specification and claims read in view of the accompanying drawings, in which:

BRIEF DESCRIPTION OF THE DRAWINGS

FIG. 10 is a sectional view taken on line 10—10 of FIG. 9;

FIGS. 11 and 12 are enlarged sectional views of sides of FIG. 10;

FIGS. 13 and 14 show modifications of control elements;

DESCRIPTIONS OF THE PREFERRED EMBODIMENTS

Figure 1:
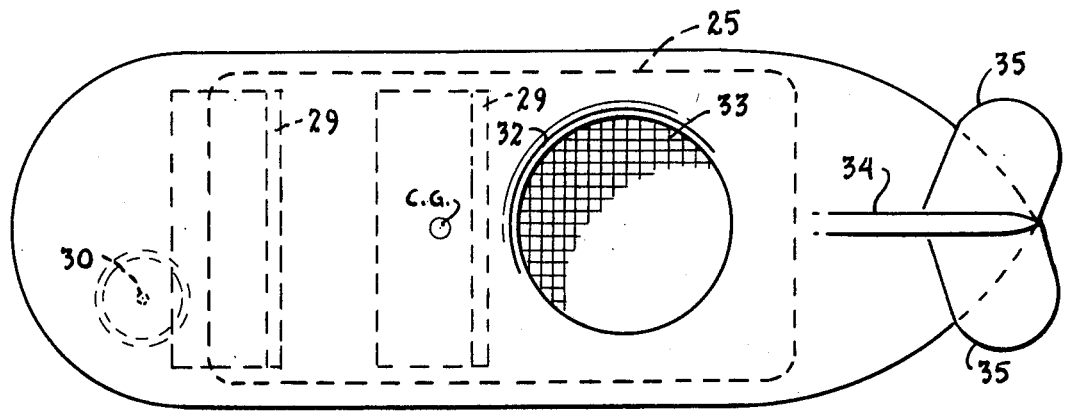
FIG. 1 is a plan view of a preferred embodiment of the invention.

Referring now to the drawings, FIGS. 1, 2, 3, and 4 show a preferred embodiment of the invention adapted to operate adjacent substantially any surface. A frame 25 supports an engine-driven blower 26 which charges the interior of the frame 25 with air and products of combustion. These products are directed downwardly and inwardly of the periphery of the frame 25, in a manner to be described in detail below, to support and control the orientation and translation of the frame above a surface 27. The frame 25 supports a body 28 of airfoil shape containing seats 29 and a control stick 30. The arrangement of the engine-driven blower 26 and the seats 29 is such with respect to the frame 25 that the operator seated in the front seat adjacent to stick 30 causes the center of gravity (C.G.) to attain substantially the position shown. Other passengers arranged adjacent the center of gravity in the rear seat 29 will then not vary the trim of the vehicle. Other passengers in the front seat 29 will vary the trim, and control mechanism to compensate for such condition will be described below.

Although the engine-driven blower 26 may be of several known types within the purview of the invention, it is preferable to use a blower having high volume output at relatively low pressure. By way of example: at a pressure of eighteen inches of water, under a frame 25 having fifty square feet of area within the peripheral jet, a total weight exceeding two tons can be raised from the surface 27. Of course, the distance from the surface determines the rate of escape of air around the frame 25, and the blower is preferably variable in volume to accommodate support at different elevations. This attribute of the invention will be explained in detail below.

This vehicle is controlled so as to move in any direction, hover, rotate around a vertical axis, as well as to move forward at high speed. Accordingly, the body 28 (FIG. 2) is airfoil shaped to provide lift force directed as indicated by the arrow L.B., which will vary substantially as the square of forward velocity to augment the lift force L.J. of the peripheral jet in the bottom of the frame 25 and the lift force of the blower L.F. induced by drawing intake air over a shroud 32 (FIG. 1). A screen 33 preferably covers the opening formed by the shroud 32. A rudder 34 is secured to the trailing section of the body 28 and is equipped with roll stabilizers 35. Control aerlerons can be employed, if desired, or jet flaps as to be described below.

Figure 2:
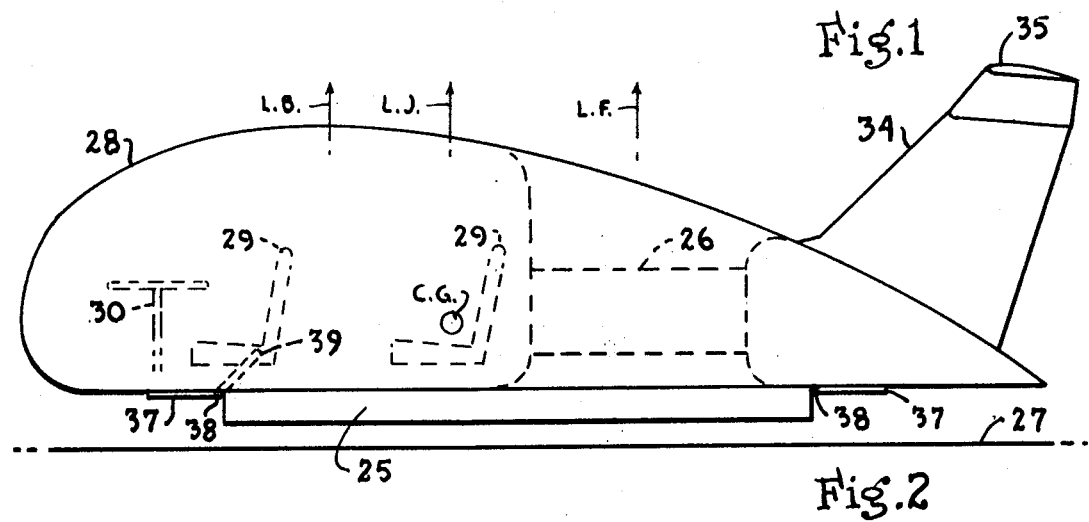
FIG. 2 is a side elevational view of FIG. 1.
Figures 3, 4:
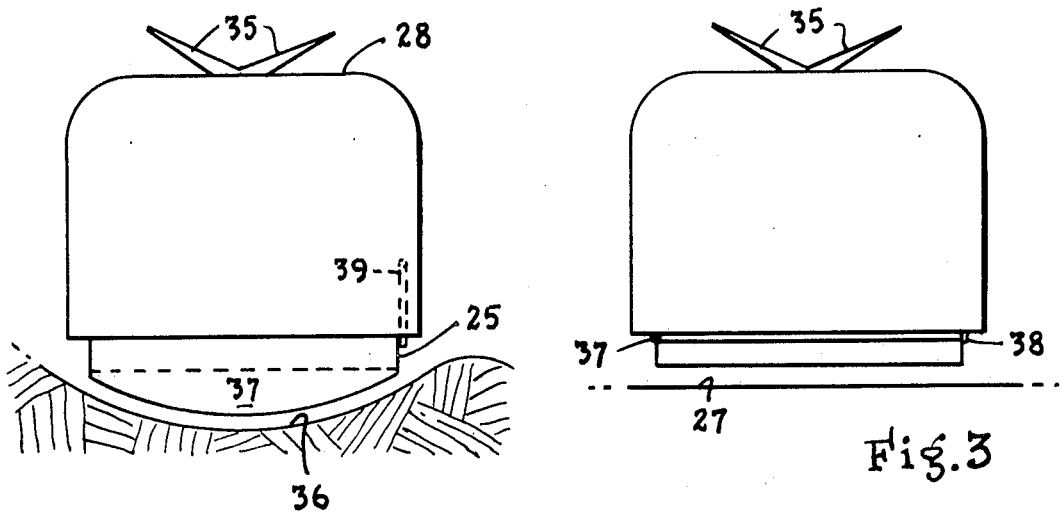
FIG. 3 is a front elevational view of FIG. 2.
FIG. 4 is a front elevational view of the device of FIG. 2 showing baffles extending downwardly therefrom toward a grooved surface.
Figure 5:
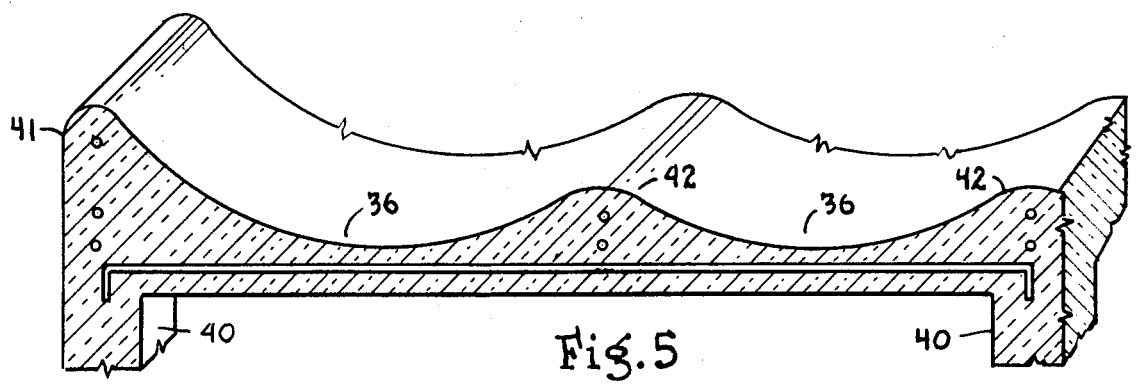
FIG. 5 is a partial cross-sectional view of a portion of road upon which the invention may operate.

The vehicle is shown in FIGS. 2 and 3 supported above a relatively flat surface 27. Provision is made operating the vehicle along roads formed as grooves 36 such as shown in FIGS. 4 and 5. A pair of baffles 37 pivoted on rods 38 linked with a handle 39 are raised to the position shown in FIGS. 2 and 3 for operation over flat surfaces 27 and lowered to the position shown in FIG. 4 for operation over grooved surfaces 36. The curvature of the bottoms of the baffles 37 provides a profile spacing the bottoms a uniform distance from the surface 36. Because of the air pressure acting on the baffles 37 it is contemplated that any known servo-system may be employed.

Roads comprise a valuable corollary attribute of this invention. The grooved surfaces 36 may be of any suitable material. Because the air cushion below the aeromobile is evenly distributed over several square feet the strength of road material is of less importance than with wheeled vehicles. Hence, the surface 36 may be earth of various sorts, but preferably one supporting a hardy grass to reduce dust. As shown in FIG. 5, bridges or the like can be made of light aggregate reinforced concrete permitting long spans between piers 40. A fence 41 is provided at the sides of the outer groove 36 to provide a deep beam for long support beams as well as blocking cross winds. Ridges 42 are placed between grooves 36. The aeromobile will center by gravity in a groove 36 but can be moved sideways to an adjacent groove by application of power and manipulation of controls to be described below. When in a groove 36 substantially no control except accelerating and braking is required once the vehicle is trimmed for translation.

Figure 6:
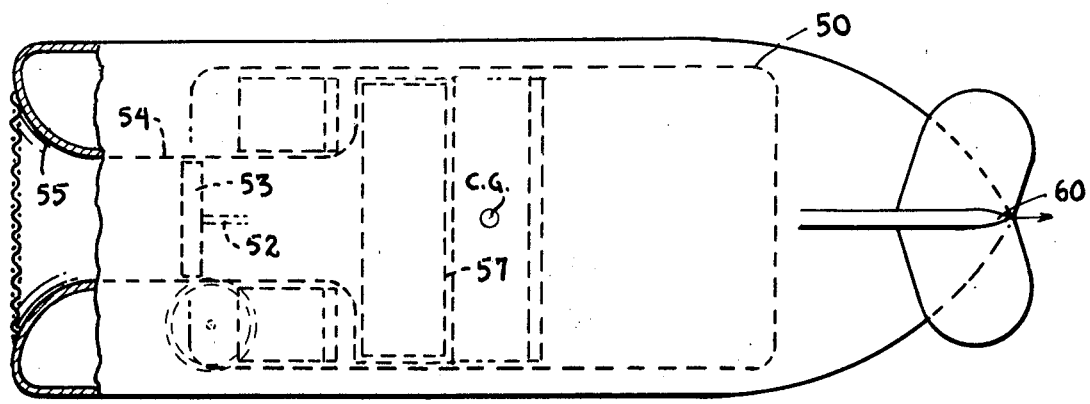
FIGS. 6 and 7 are views similar to FIGS. 1 and 2, but of a modification of the invention.
Figure 7:
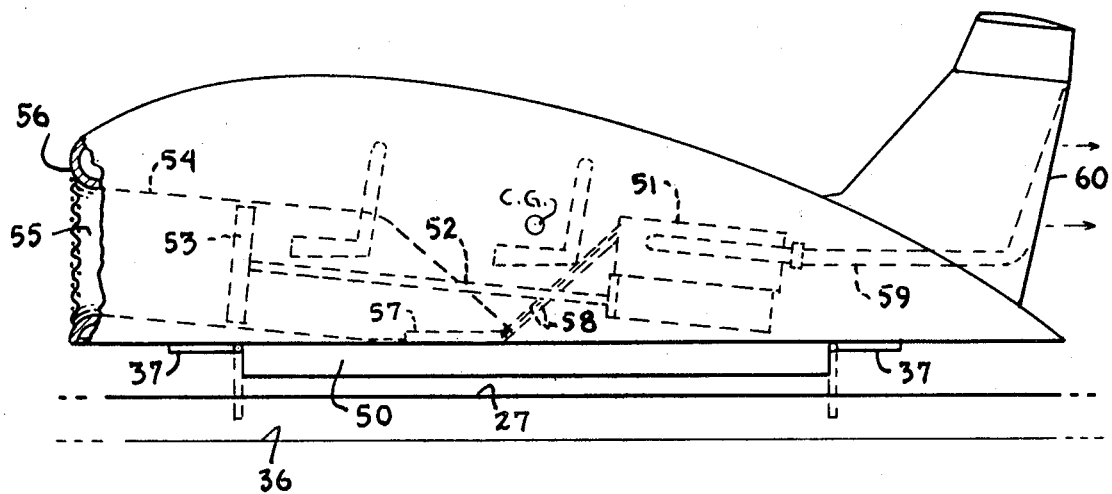

In FIGS. 6 and 7 a modification is shown incorporating a ram-jet scoop and a jet-flap aerodynamic control. A frame 50 is substantially the same as the frame 25 described above. An engine 51 turns a drive shaft 52 connected to a blower 53 positioned in a duct 54. A faired scoop 55 forms an entrance to the duct 54. The scoop 55 is preferably of large area and the upper portion 56 thereof may be fabricated of transparent plastic or the like for visibility. A radiator 57 is connected by pipes 58 to the engine 51 for cooling the engine and diffusing the air into the frame 50. An exhaust pipe 59 directs exhaust gas out of a movable slit 60 for providing control and propulsion moments. This modification is also provided with baffles 37 for operation over flat surfaces 27 or curved surfaces 36.

Figure 8:
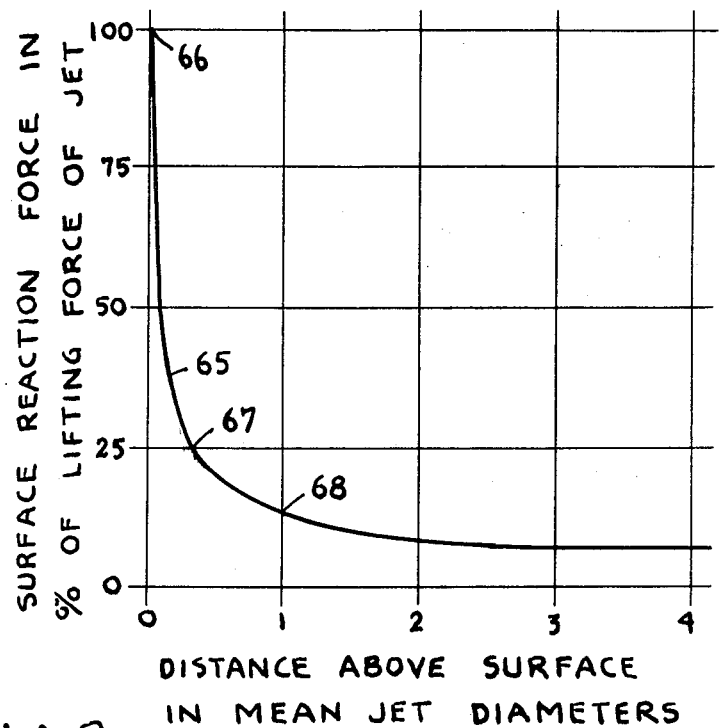
FIG. 8 is a chart of theoretical performance of the invention.

FIG. 8 comprises a chart representing some average of forces available for sustentation of the aeromobile. It is to be understood that exact forces cannot be represented because of variable surface conditions and turbulent airflow. Being a reaction force it is assumed that one-hundred percent of lifting force of the jet is available when the aeromobile is resting upon a support surface. As the distance above the surface is increased the reaction force decreases. This is plotted as a function of mean jet diameters to co-ordinate same to known experimental data — for example, that contained in "National Advisory Committee for Aeronautics," Technical note 3982, April, 1957. It is to be noted that line 65 decreases sharply from the 100 percent force position 66 to the 25 percent force position 67. Further movement of the aeromobile away from the surface decreases the reaction force to a negligible value beyond substantially one-mean-jet diameter 68.

With a mean jet diameter of 7 feet it become possible to maintain the aeromobile several inches above a support surface 27 or 36. The sustentation force will absorb approximately 25 to 75 percent of the total energy 66 available in the jet. However, in this invention the remaining energy is not dissipated; but is used in large part for propulsion. In jumping obstacles, burst of jet energy may be released through the outlets. Since the aeromobile is in levitation and translation upon encountering an obstacle a relatively high or long obstacle can be cleared. In addition to this jet force, there are augmenting forces contributed by aerodynamic phenomena and the ram-jet attribute of the modification shown in FIGS. 6 and 7.

Figure 9:
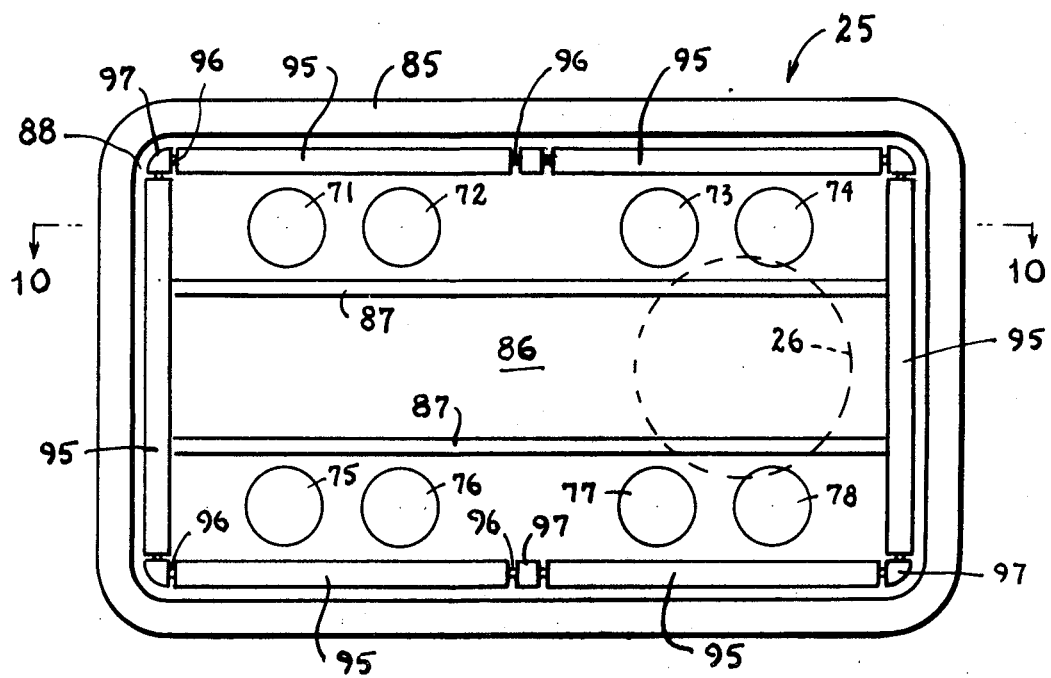
FIG. 9 is a bottom view of an operating part of the invention.
Figure 15:
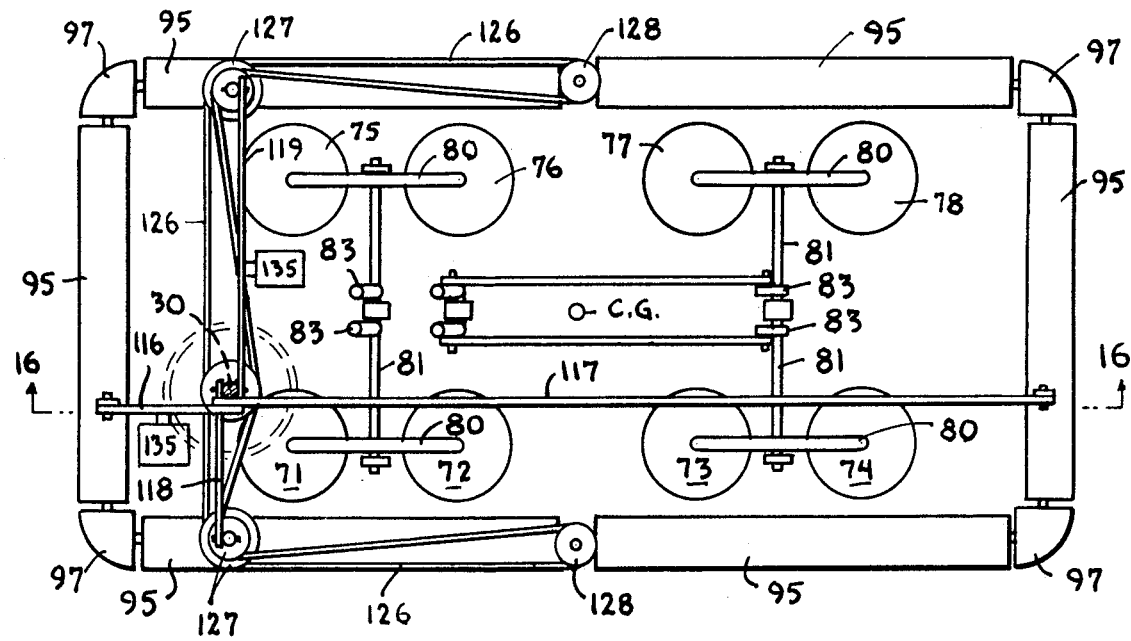
FIG. 15 is a plan view showing a preferred arrangement of control elements.
Figure 16:
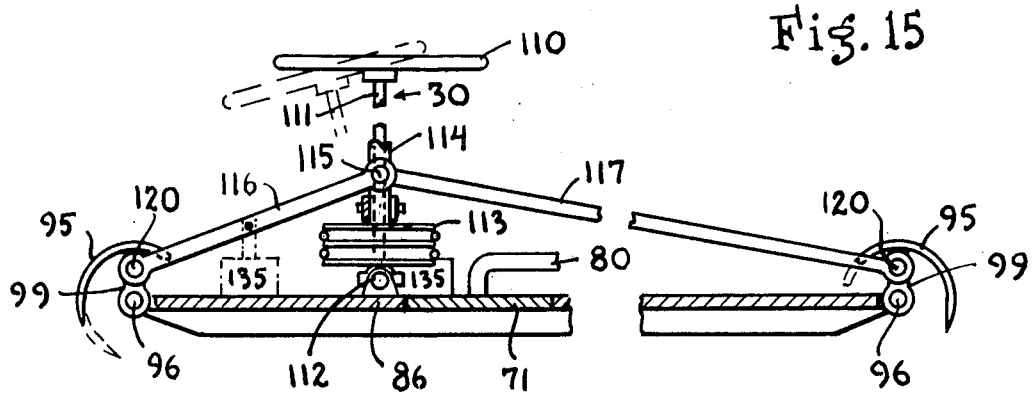
FIG. 16 is a sectional view taken on line 16—16 of FIG. 15.
Figure 17:
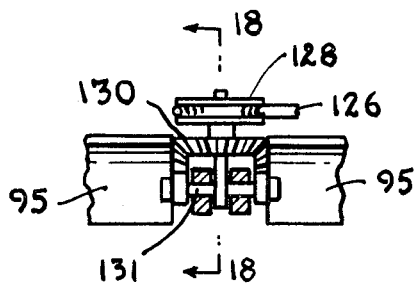
FIG. 17 is a gear detail view.
Figure 18:
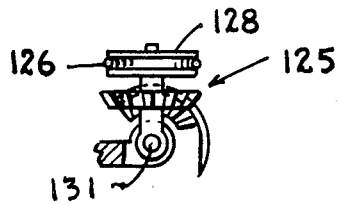
FIG. 18 is a sectional view taken on line 18—18 of FIG. 17.

FIG. 9 is a bottom view of the frame 25 and FIG. 10 is a side view thereof. This frame 25 can be used for any of a number of purposes. As shown in these figures, a pallet truck may be provided by securing all manual controls in a box placed to the right of the structure as viewed in FIG. 10. Thus the top 70 of the frame 25 can support loads. Several valves 71–78 are provided for trimming the frame 25 under different loads. In addition, all valves 71–78 can be opened for maximum lift. At such time the blower 26 is energized to supply additional air under pressure. For ease of operation the valves 71–78 are preferably connected in pairs to compensate air pressure. As shown in FIG. 15, valves 71-72 are connected to a lever 80 pivoted at 81 in a bracket. The lever 80 is rocked by a control arm 83 to raise one valve and lower the other simultaneously in the manner of a balanced valve thus compensating for air pressure which will exert substantially equal downward forces on the valves 71-72. Other pairs of valves 73-74, 75-76, and 77-78 are arranged likewise. However, the several pairs of valves 71-78 are controlled differently for trim and collectively for jumping operations, as will be explained more fully below.

The frame 25 is rectangular in plan view (FIGS. 9 and 15) and includes a top member 70 having a downwardly flanged peripheral lip 85 (FIGS. 11 and 12) shaped to direct air downwardly relative to the frame 25 and inwardly relative to the lip 85. The frame 25 further includes a center-plate 86 disposed below the top 70 and inwardly of the peripheral lip 85. The center-plate 86 is provided with a plurality of ribs 87 that serve to strengthen the center-plate 86 against deflection due to pressure, provide rests for the vehicle, and act as keels during translation. When desired, the ribs are supplied with friction material for emergency braking to be described hereinafter under OPERATION.

The frame 25 is provided with a peripheral slot 88 disposed between the lips 85 and the center-body 86, which slot 88 preferably extends completely around the center-body member 86 of the frame 25. The blower 26 is driven by a suitable engine 89 and generates energized air, which air, mixed with exhaust gas, is diffused by a radial diffuser 90 into a substantially void chamber 91 formed within the frame 25 between the top 70 and center-plate 86 thereof. The energized air is diffused throughout the chamber 91 and is exited therefrom through passages 101 formed by the peripheral slot 88 to engage the reaction surface 27 or 36 (FIGS. 3 and 4) and form a pressurized gas cushion between the surface 27 or 36 and frame 25.

For controlling movements of the aeromobile, control vanes 95 are provided. These vanes 95 may be identical sections mounted on pivots 96 journaled in bars 97 (FIG. 9) connected to the upper surface 70 ends and sides of the centerplate 86. Each section is connected to a control arm 99 for automatic and/or manual control to be described below. Flow-control dampers 100 are positioned to control the volume of gas flowing past any one or all of the control vanes 95. The dampers 100 function in a manner augmenting the functions of valves 71-78 and either or both can be employed as desired. However, the dampers also augment translation movements created by the control vanes 95 as well as total thrust of the jet.

The vanes 95 when in the full line positions shown in FIGS. 11 and 12 are engaged by air moving in the direction of the flow arrows and direct same around peripheral slot passages 101. The aerodynamic action herein obtained is explained fully in my co-pending application Ser. No. 652,298 Apr. 11, 1957, now abandoned and entitled AIRCRAFT. Lift is obtained and augmented by rotation of a mass of gas through a substantial angle, exceeding 90°. The resultant lift in the aeromobile augments the jet reaction force mentioned above. The velocity of flow of gas over the vanes 95 and through the peripheral slot passage 101 is relatively high even though the pressure of gas within the chamber 91 is of low value.

Assuming a maximum pressure within the chamber 91 of 1 pound per square inch, and a pressure below the aeromobile of two-thirds of a pound per square inch, the pressure then causing flow of air through passages 101 will be substantially nine inches of water. From empirical airflow tables, this pressure will create a velocity in excess of 150 feet per second. Because the kinetic energy of the air is a function of the square of the velocity thereof, the lift or thrust acting upon the vanes 95 and passages 101 is substantial.

FIGS. 13 and 14 show modifications for obtaining more lift or thrust. In FIG. 13, two vanes 105 are rotated around a pivot 106 in the passage 101. The vanes 105 are preferably shaped and spaced to create thrust and when moved will vary the lateral force acting on the vehicle. FIG. 14 shows a plurality of fixed vanes 107 provided with trailing flaps 108 that control the net thrust of the vanes 107. There may be more or less than the three flaps 108 shown to vary the gross effect of same. Further, the vanes 108 may be divergent with respect to each other to diffuse the air passing over them. Obviously other known control means can be incorporated into these control systems when desired or necessary for efficient functioning.

With any of the above control systems it is found to be desirable to direct the air inwardly beneath the center-plate 86. The peripheral jet emitting from the passage 101 will then create an air-screen to partially entrap air below the plate 86. As a result of entrapment, the air below the plate 86 will be under pressure to float the vehicle on a volume of gas. By varying the net direction of flow of the screen of air, translational and arresting forces can be established to render the vehicle dirigible.

FIGS. 15 through 18 show a control system adapted for manual and/or automatic operation. The control stick 30 comprises a wheel 110 secured to a rod 111 journaled in a gimbal 112 mounted on the frame of the vehicle, shown on the center-plate 86. One or more sheaves 113 are secured to the rod 111 for a control purpose to be explained below. A tube 114 is mounted on the rod 111 and has pins 115 journaled to control bars 116, 117, 118, and 119, which bars in turn are journaled on pins 120 connected to control vanes 95, bars 116 and 117 (FIG. 16) show the structural details and bars 118 and 119 are similarly connected. Forward movement of the wheel 110 to the dotted line position will rotate the fore and aft vanes 95 in a counter-clockwise direction. Right and left movements of the wheel 110 control the side vanes 95.

To control body rotation, the side vanes 95 are geared together by a partial differential gear 125. Rotation of the wheel 110 turns the sheaves 113 which move belts 126 directed over rotatably connected idler sheaves 127 to each of the forward side vanes 95, which belts 126 are then directed to gear-operating sheaves 128 connected to control gear 130 of the differential gear 125. The control gear 130 when turned will move one side vane 95 with respect to the other around a pivot 131. As a result of differential movement of the side vanes 95 a difference in thrust will be effected to impart a rotation about a vertical axis of the vehicle.

To trim the aeromobile under different loadings the valves 71-78 are operated. For example, if the right-front corner (upper left-FIG. 15) of the vehicle is heavy, the arm 83 is rotated to open valves 75 and 76, whereby more air will be directed below this corner of the machine to trim same.

Automatic control is readily adapted to the above manual control. As shown, a pair of gyroscopically controlled motors 135 are connected to control arms 116 and 119 for controlling fore and aft and transverse moments respectively. Inasmuch as such controls are well known, details of construction form no part of this invention. It is contemplated that the aeromobile will operate favorably along roads equipped with structure to which automatic controls can respond. For example, a radio beam can be used; or a wire, or the like, can be buried beneath the surface and a magnetic field can respond thereto for guidance, or the wire may be magnetizable to carry intelligence to which the aeromobile control will respond for fully automatic operation. The latter system can be particularly useful when the invention is used as a pallet truck. A magnet wire can be energized and laid down to cause the truck to deliver a pallet to a remote place, leave same, and return for another pallet.

Figure 19:
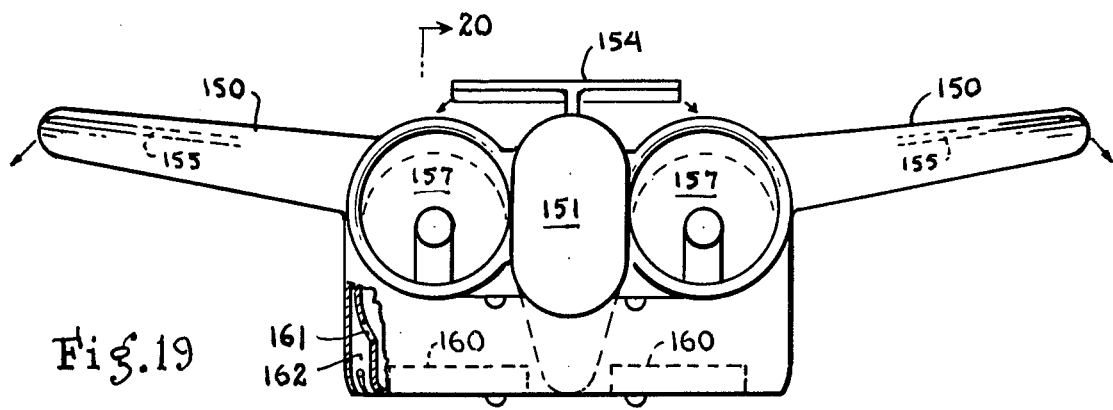
FIG. 19 is a front elevational of the invention incorporated as a ground reactant supporting element for an airplane.
Figure 21:
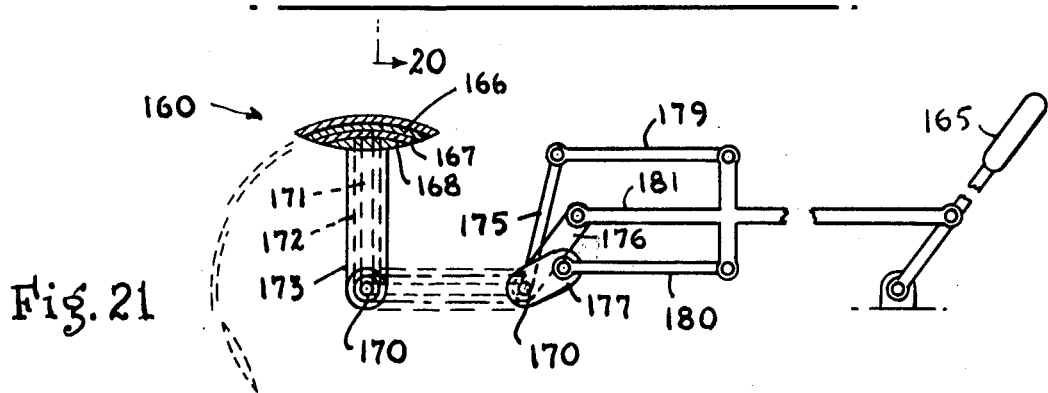
FIG. 21 is a diagrammatic view of fore-and-aft control for the airplane.
Figure 20:
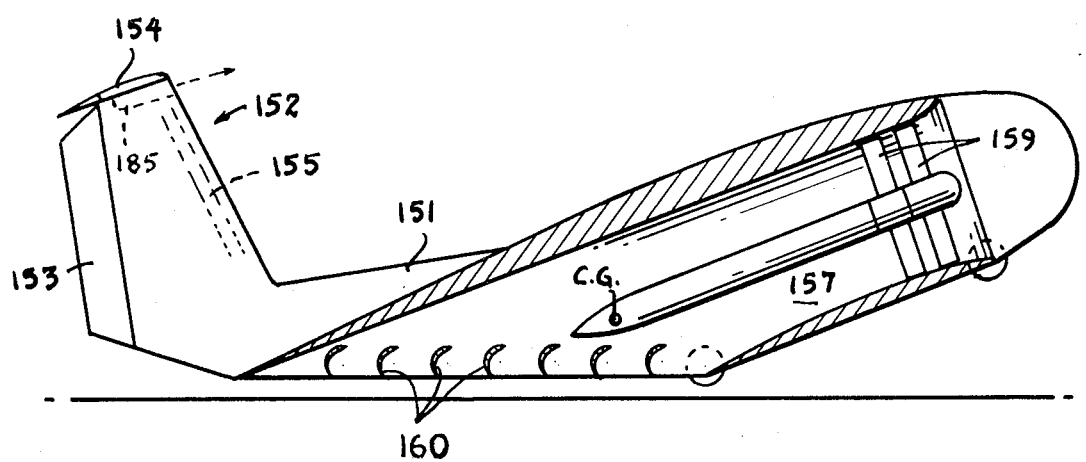
FIG. 20 is a sectional view taken on line 20—20 of FIG. 19.

FIGS. 19, 20, and 21 show features of the aeromobile adapted to a STOL (short take-off and landing) aircraft. Such features eliminate landing gear and provide degrees of control not present with present ground gear. One significant advantage comprises the ability to land in any desired direction regardless of prevailing wind direction. Other significant advantages reside in the amphibious quality rendered ability to back-up, move sidewise, rotate, and provides cross-wind gears.

The airplane may be of any suitable configuration, and by way of example is shown as a mono-plane having wings 150 mounted on a fuselage 151 having an empennage 152 including a rudder 153 and an elevator 154. Exhaust gases from an engine or engines, not shown, may be let through ducts 155 and exhausted downwardly and rearwardly through slits 155a in the tips of the wings 150 and the elevator 154 to provide propulsion and turbulance counteracting forces. A pair of ducts 157 are faired into the fuselage 151 and the wings 150. Propellers 159 draw air into these ducts 157 and force it rearward over control vanes 160. A portion of entrained air passes through ports 161 (only one shown) into side chambers 162 and blown downwardly and inwardly over one or more control vanes that may be of any of the types described above to give lateral and rotational control such as described in connection with FIGS. 15-18.

The propellers 159 and control vanes 160 are adapted to function in a manner similar to that disclosed in the above mentioned co-pending AIRCRAFT application. A control lever 165 rotates air reaction surfaces 166, 167, and 168 around a pivot 170 through arms 171, 172, and 173 connected respectively to cranks 175, 176, and 177 in turn connected with arms 179 and 180 and a cruciform link 181 connected to the control lever 165. When the lever 165 is moved to the left the sections 166-168 are rotated counter-clockwise more or less to the dotted line position. In the extreme position the air stream is rotated in the direction of the flow arrows substantially in excess of 90° to provide a substantial force. With the sections nested only a small drag is present and propeller thrust will move the airplane forward. With the sections partially extended the propeller thrust is counteracted to cause the vehicle to hover on a volume of air. With the sections fully extended a rearward net thrust obtains to stop the craft quickly. For emergency stops a cartridge 185 can be discharged and/or the tip jets reversed by suitable valves, not shown.

AEROMOBILE OPERATION

With the engine-blower 26 (FIG. 2) operating, the quantity of air delivered generally will vary directly with the speed of the blower, the energy in the air will vary as the square of this speed, and the horsepower required will vary as the cube of the speed. Of course, variations in design cause divergence from these hypothetical criteria. Accordingly, it is preferred to entrain a large quantity of air at relatively low velocity to operate the aeromobile at economical horsepower. To vary the total buoyant force of the vehicle, the horsepower is increased as by opening a throttle (not shown) in conventional manner.

With the control stick 30 in its vertical position air will be directed out of passages 101. The side passages 101 may be narrower than the fore and aft passages to provide the largest quantities of air to the latter passages for propulsion and braking operations. If the front of the aeromobile is heavy with respect to the rear, valves 71, 72, 75, and 76 can be opened to trim the vehicle. Conversely, if the rear is heavy with respect to the front, valves 73, 74, 77, and 78 can be opened. Valves 71-74 and 75-78 control the left and right sides of the vehicle respectively.

To turn or rotate the aeromobile, the wheel 110 is rotated, for example, to cause relative differential movement of the right-front and left-rear, and right-rear and left-front vanes 95 to create either a clockwise or a counter-clockwise movement around the center of gravity of the aeromobile.

To cause the aeromobile to move sidewise, the stick 30 is moved to the right or left to move all of the side vanes 95 clockwise or counter-clock-wise respectively to create a lateral component of force to flow of air. When traveling forward, the lateral control is adjusted to compensate for cross winds.

Forward and rearward moments of the vehicle are controlled by fore and aft movements of the stick 30. The fore and aft vanes 95 are rotated counter-clockwise by moving the stick 30 forwardly to cause acceleration and forward movement of the vehicle while rotating the fore and aft vanes 95 clockwise by moving the stick 30 rearwardly results in either a braking effect or reverse movement of the vehicle. To maintain a steady-state translation; the fore and aft vanes 95 assume an intermediate position of the two positions hereinbefore described.

When the vehicle is in motion, the airfoil shape of the vehicle body aids to support the vehicle above the reaction surface 27 or 36 and a portion of the energized air normally necessary to provide the air cushion support may be diverted for propulsion purposes such that the horsepower requirement for high speed translation is not excessive. The ram air effect of the air scoop modification of FIGS. 6 and 7 further augments the function of the blower to render the vehicle a more economical operation.

Generally when the vehicle is in motion, particularly on a road as shown in FIGS. 4 and 5, the control stick 30 does not require manipulation. The machine can be operated over any surface and with the baffles 37 in lowered position (FIG. 4) the vehicle can be self controlled over a grooved road. Further, an automatic control 135 (FIG. 15) may be provided as a substitute for manual control when so desired.

To stop the vehicle under normal operation, the aft vane 95 is lowered with a corresponding rise of the fore vane 95. For emergency stops a reaction cartridge can be fired and/or the blower 26 turned off to cause the vehicle to settle upon its bottom. Obviously surface brakes could be lowered or side vanes extended in known manner if desired.

Although a number of preferred embodiments of the ground effect vehicle of this invention have been hereinabove fully described, it is to be remembered that various alterations and modifications can be made thereto without departing from the invention as defined in the appended claims.

I claim:

1. A ground effect vehicle comprising a substantially rectangular platform, a lip extending downwardly from the periphery of said platform to form a chamber with an opening facing downwardly, a plate mounted parallel to said platform within said chamber a short distance above the lower edges of said lip, said plate conforming to the rectangular shape of said platform and its outer edges being spaced inwardly from said lip to form a substantially continuous downwardly facing peripheral slot, said platform having an opening downwardly therethrough, a blower mounted on said platform and communicating through said opening to said chamber, said blower being operable to provide a sufficient stream of gas downwardly through said peripheral slot to support said vehicle on a cushion of gas, a plurality of control vanes serially mounted within said slot parallel to the sides of the slot and along substantially the full length thereof, fore and aft ones of said vanes being positioned in the lateral portions of said slot across the fore and aft portions respectively of said vehicle, there being a plurality of longitudinal ones of said vanes within said slot along each side of said vehicle, those side vanes in front of the center of gravity being designated as forward side vanes and those behind the center of gravity being designated as rearward side vanes, each of said vanes being mounted for rotation about a respective axis parallel to respective side portions of said slot, each of said vanes being rotatable to a position for directing gas emitted from said slot downwardly to cause said vehicle to hover and also rotatable in either direction from that position to move said vehicle, first control means connected to said fore and aft vanes operable to rotate said fore and aft vanes in unison in the same direction for controlling forward and rearward movement of said vehicle, second control means connected to said forward side vanes and said rearward side vanes along both sides of said vehicle operable to rotate said forward side vanes and said rearward side vanes in unison in the same direction to control sidewise movement of said vehicle, and third control means connected to said forward side vanes and said rearward side vanes along both sides of said vehicle operable to rotate said forward side vanes in unison in either direction and said rearward aft vanes in unison in the opposite direction to turn said vehicle while it is either traveling or hovering.

2. A ground effect vehicle as claimed in claim 1 having a plurality of dampers, said dampers being rotatably mounted in said chamber in locations spaced inwardly from respective ones of said vanes, and said dampers being operable selectively to control the amount of flow of gas through different adjacent portions of said slot.

3. A ground effect machine as claimed in claim 2 having a plurality of valves in said plate dispersed about the center of gravity of said vehicle, said valves being operable selectively between closed positions and open positions to trim said vehicle.

4. A ground effect machine as claimed in claim 3 having control means connected to said valves, said valves being coupled in pairs to said control means to lower one valve of each of said pairs while raising the other of the pair such that the force required to move one valve in an upward direction opposite the direction of the flow of air therethrough balances the force supplied by moving the other of a respective pair in the same direction as the flow of air therethrough.

5. A ground effect machine as claimed in claim 1 wherein said vanes are arcuate in cross section, the concave edge of said arcuate vanes facing the adjacent edge of said plate.

6. A ground effect machine as claimed in claim 1 having a plurality of baffles, each baffle pivotally mounted to the lower edge of a respective portion of said lip outside said slot, said baffles upon being rotated downwardly functioning as a skirt that extends from said lip almost to the surface over which said vehicle is traveling.

* * * * *